April 17, 1962 R. W. HALL 3,030,600
FLEXIBLE OSCILLATING ELECTRIC JOINT
Filed Feb. 1, 1960
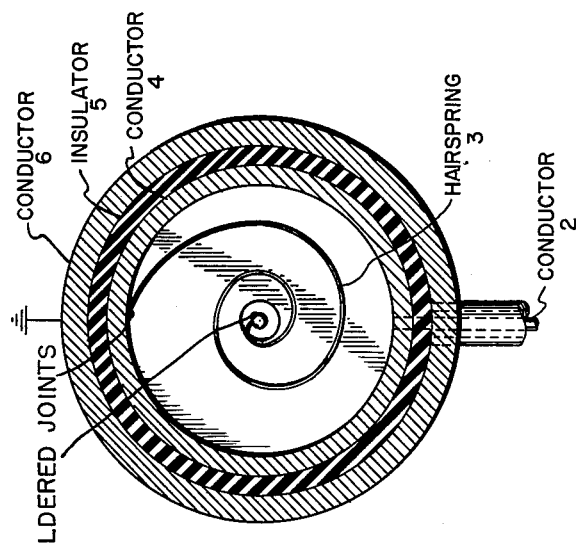
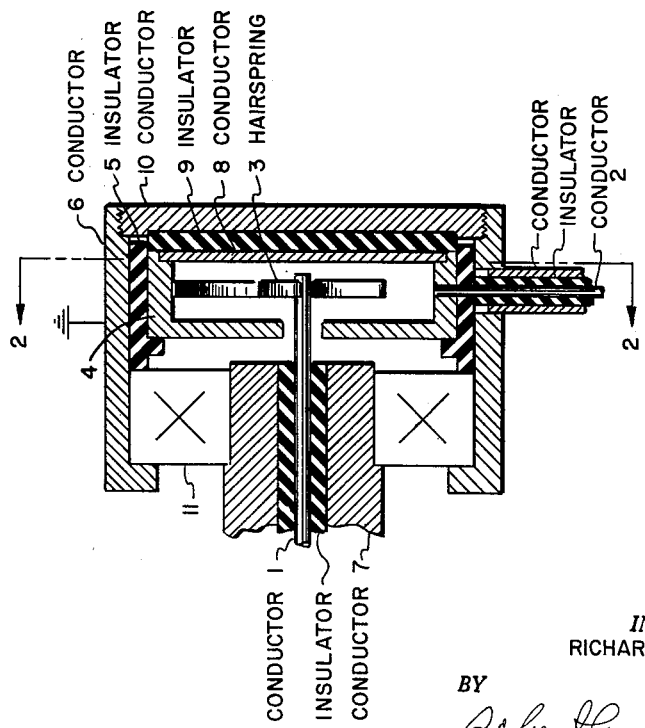
INVENTOR.
RICHARD W. HALL
BY
ATTORNEY United States Patent Office 3,030,600
Patented Apr. 17, 1962

3,030,600
FLEXIBLE OSCILLATING ELECTRIC JOINT
Richard W. Hall, New Canaan, Conn., assignor to Barnes Engineering Company, Stamford, Conn., a corporation of Delaware
Filed Feb. 1, 1960, Ser. No. 5,696
6 Claims. (Cl. 339—2)

This invention relates to a double shielded, flexible, electric joint of extremely low noise.

In a number of instruments used in the measurement if infrared radiations or for determining the presence of a faint and distant target by its infrared radiation the radiation is chopped or the same effect is obtained by periodically moving a radiation detector across the field, for example, by oscillation. By suitable electronic circuits and multiple detectors it is possible to cancel out practically all radiation from a uniform background even though the total radiant flux may be many orders of magnitude greater than that from a distant or faint target. The cancellation is effected by reason of the fact that the radiation detectors produce a D.C. output from the uniform background but an A.C. output of extremely low signal amplitude from the faint target. A.C. amplifiers, of course, reject the D.C. signal completely. However, a very small electrical signal from a distant or faint target is peculiarly at the mercy of noise, even extremely low level noise, anywhere in the electronic processing system. Electronic circuits such as amplifiers and the like can be designed with extraordinarily low inherent noise but noise already generated in the detectors or their associated connections cannot be eliminated by any design of the amplifier. Often this constitutes the limitation of the sensitivity of the instrument. It is with a solution of this problem that the present invention deals.

While the use in extremely sensitive infrared instruments involving oscillating detectors such as are described and claimed in a copending application, Serial No. 19,098 filed March 31, 1960, now abandoned, is an important field, the present invention is not limited to such instruments and is applicable whenever extremely low noise flexible electric joints are required.

The problem of flexible joints between a movable conductor and fixed electronic apparatus presents no serious problem in ordinary electric circuits where an extremely low noise joint is not necessary. In general, flexible joints are produced by connecting the fixed part of the apparatus to the moving conductor through a flexible connector which may be of any suitable shape and is preferably in the form of a hair spring. It is possible to form hair springs with opposing winding which are of constant inductance but even these hair springs move relative to other metal parts resulting in capacitative changes which produce a very small A.C. signal. Small as this spurious signal is, in sensitive infrared radiometers it may constitute a serious limitation because the signal may be much larger than the small signal from a distant or faint target.

At first it was attempted to eliminate the noise by shileding, either putting a shield around the whole joint and grounding the shield to the ground of the electronic circuits or by connecting the shield to the stationary conductor. Neither attempt is satisfactory. There still remains noise of serious proportions.

The present invention solves the noise problem by using two shields entirely independent of each other and not movable with respect to each other, one at the potential of the moving conductor and stationary conductor and another shield outside the first shield at electronic chassis ground potential. This solved the problem producing a joint of such phenomenally low noise, orders of magnitude below the noise requirement in ordinary electrical equipment, that extremely sensitive instruments could be designed in which the flexible joint was no longer a limiting condition determining sensitivity.

It is an advantage of the present invention that the exact shape of the shields is immaterial within wide limits. However, in extremely compact instrumentation, which is often required in infrared radiometers, it is desirable to make the joint of the present invention very small in size and in such cases there is a mechanical advantage in insulating the shields from each other by means of dielectrics other than air. In its broader aspects the invention is not limited to the particular dielectrics used insulating the two shields.

The invention will be illustrated in greater detail in conjunction with the drawings in which:

FIG. 1 is a vertical cross section through the joint, and
FIG. 2 is a cross section at right angles to FIG. 1 along the line 2—2.

The drawings ilustrate a joint with an oscillating shaft 7 carrying a conductor 1. This has to be connected to a fixed conductor 2 so that the shaft 7 can oscillate through a predetermined arc. The connection is illustrated as a hair spring 3 which connects to a capacitative shield 4 which in turn is connected to the conductor 2. In FIG. 2 this connection is shown at a part of the shield opposite to the conductor 2 but, of course, the connection can be to any point of the shield. The illustrated connection is preferred since it removes the two points where soldered joints are required sufficiently so that the soldering of one does not endanger the other.

Surrounding the shield 4, which is at the same potential as the conductors 1 and 2 and may, therefore, be considered to be at the potential of whatever electrical signal is coming from the conductor 2, is an insulator 5 with an opening for the conductor 2 and this in turn is surrounded with a second shield 6 which is connected to chassis ground for the electronic circuits. This shield carries ball bearings 11 in which the shaft 7 is journaled.

A brief analysis will bring out the advantages of the present invention. In general the type of low level noise which is present in flexible joints is caused by relative motion of the flexible conductor with respect to other points of the electronic circuits. In the present case the flexible connector is completely shielded from other components by reason of the shield 4 which is at the same potential as the conductor itself. In other words relative movement of the flexible portions of the conductor does not create any signal between the conductor and the shield 4. The shield 4 is fixed with respect to shield 6 and, therefore, is completely shielded from other components of the electronic circuits by the shield 6 which is connected to chassis ground. As a result no noise can develop between the shield 4 and other electronic components. Noise is reduced to so low a figure that it no longer becomes a significant limiting factor.

A consideration of FIG. 1 shows that the successive shields and insulating portions can be made in very compact form and in fact the right hand portions of these elements can be formed in the shape of threaded components which go into the nest of the shields and insulators. The cover portion of shield 4 is designated in FIG. 1 by the numeral 8, the cover portion of the insulator by 9 and the cover portion of the outer shield 6 by 10. They may be in the form of separate elements or a single laminated cover may be used.

As has been pointed out above the present invention is not primarily concerned with the nature of the dielectric 5. This can be air but in the case of instruments which may be subjected to some vibration air presents some drawbacks because under vibration relative movements of the shield 4 and the shield 6 may take place. Since these are at different A.C. potentials this relative movement can result in a noise signal. The noise signal will be very much less than if the shield 6 were not there but it will not be quite as low as if the relative positions of shields 4 and 6 are maintained fixed which can be done easily if the dielectric 5 is a solid dielectric. For this reason in installations where vibration may be encountered solid insulation between the two shields is preferable.

What is claimed is:

1. An extremely low noise, flexible, electric joint permitting limited rotation of at least one conductor comprising in combination,
   (a) a first conductor and a second conductor, a flexible connector between them,
   (b) the first conductor being formed at its end in the shape of a container, a small opening in the said container through which the second conductor projects whereby said container substantially completely surrounds the flexible connection,
   (c) the relative rotation of the second conductor being substantially concentric with the opening,
   (d) and a grounded shield surrounding said container, fixed in position relative thereto and insulated therefrom.

2. A joint according to claim 1 in which the insulation between shields is a solid dielectric.

3. A joint according to claim 1 in which one of the conductor elements is part of an oscillating shaft and the other conductor a relatively stationary conductor, the first shield being electrically connected to said relatively stationary conductor.

4. A joint according to claim 3 in which the flexible connector is a spiral.

5. A joint according to claim 3 in which the insulation between the two shields is a solid dielectric.

6. A joint according to claim 5 in which the flexible connector is a spiral.

References Cited in the file of this patent

UNITED STATES PATENTS

| | | |
|---|---|---|
| 2,333,532 | Frakes et al. | Nov. 2, 1943 |
| 2,473,705 | George | June 21, 1949 |
| 2,515,333 | Buffington | July 18, 1950 |
| 2,594,004 | Farish | Apr. 22, 1952 |
| 2,877,435 | Alvine | Mar. 10, 1959 |

FOREIGN PATENTS

| | | |
|---|---|---|
| 518,098 | Great Britain | Feb. 16, 1940 |